(12) United States Patent
Lee et al.

(10) Patent No.: US 9,415,548 B2
(45) Date of Patent: Aug. 16, 2016

(54) FEEDING APPARATUS FOR FORMING 3D OBJECT

(71) Applicants: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

(72) Inventors: Yang-Teh Lee, New Taipei (TW); Yi-Chin Tang, New Taipei (TW)

(73) Assignees: XYZPRINTING, INC., New Taipei (TW); KINPO ELECTRONICS, INC., New Taipei (TW); CAL-COMP ELECTRONICS & COMMUNICATIONS COMPANY LIMITED, New Taipei (TW)

( * ) Notice: Subject to any disclaimer, the term of this patent is extended or adjusted under 35 U.S.C. 154(b) by 145 days.

(21) Appl. No.: 14/560,120

(22) Filed: Dec. 4, 2014

(65) Prior Publication Data

US 2016/0059492 A1   Mar. 3, 2016

(30) Foreign Application Priority Data

Aug. 28, 2014  (TW) .............................. 103129761 A

(51) Int. Cl.
  *B29C 67/00* (2006.01)
  *B33Y 30/00* (2015.01)
  *B33Y 50/00* (2015.01)

(52) U.S. Cl.
  CPC ............. *B29C 67/0088* (2013.01); *B33Y 30/00* (2014.12); *B33Y 50/00* (2014.12)

(58) Field of Classification Search
  None
  See application file for complete search history.

(56) References Cited

U.S. PATENT DOCUMENTS

2012/0161350 A1 * 6/2012 Swanson ................. B29C 47/92
264/40.7

FOREIGN PATENT DOCUMENTS

| CN | 203293543 U | * | 11/2013 |
| CN | 203496156 U | * | 3/2014 |
| CN | 103737934 A | * | 4/2014 |
| CN | 203792575 U | * | 8/2014 |
| DE | 202005018939 U1 | * | 2/2006 |

* cited by examiner

*Primary Examiner* — Ryan Ochylski
(74) *Attorney, Agent, or Firm* — Chun-Ming Shih; HDLS IPR Services

(57) ABSTRACT

A feeding apparatus for forming 3D object includes a frame structure, a transmission set, an actuator, a swing unit and a controller having a sensor. The feeding apparatus is arranged on a 3D printer equipped with printing mechanism and a filament spool. When the filament is fed into a passageway of the frame structure to push the swing unit, the sensor senses the displacement of swing unit to generate a sensing signal. The controller controls the actuator to drive the transmission set according to the sensing signal, whereby the wire can be smoothly fed into the printing mechanism.

14 Claims, 8 Drawing Sheets

FEEDING APPARATUS FOR FORMING 3D OBJECT

BACKGROUND OF THE INVENTION

1. Technical Field

The technical field relates to a printer; in particular, relates to a 3D printer for forming a 3D object.

2. Description of Related Art

The 3D printing technology is to stack the powdered metal or plastic materials which are adhesive to print a 3D object.

Take a 3D printing device in a FDM type (Fused Deposition Modeling) for example, it is usually to feed the thermoplastic material into a printing mechanism first. After the thermoplastic material is heated and melted, it would be coated layer by layer on the base of the 3D printing device so as to cool and harden the thermoplastic material. The thermoplastic material would be modeled layer by layer to form a 3D object.

To be concrete, the FDM type 3D printer has an open type or a partial open type machine body, and there is a 3D moving mechanism configured inside the machine body. A printing mechanism such as a printing head or a printing nozzle is configured on the guiding rod of the 3D moving mechanism. The thermoplastic material used for printing might be the filament, the filament is placed in the filament spool, and the filament spool is arranged on the external surface of the machine body. The filament in the filament spool would be withdrawn to the printing mechanism. During the printing process, when the printing mechanism determines the filament is positioned and placed into the printing mechanism via the sensing element, the motor drives the printing mechanism to feed the filament to print out a 3D object.

However, the sensing element used in the printing mechanism is a shielded sensing element and the filament used by the 3D printer is translucent, so it would result in sensing errors by the sensing element. Also, there is a distance between the printing mechanism and the filament spool arranged on the external surface of the machine body, so the motor of the feeding mechanism might not transmit the filament smoothly. As a result, the filament could not be effectively transmitted to the printing mechanism so that it might decrease the printing quality of 3D object.

SUMMARY OF THE INVENTION

The disclosure is directed to a feeding apparatus configured between the printing mechanism and the filament spool in the disclosure so as to smoothly transmitting the filament for the 3D printer.

One of the exemplary embodiments provides feeding apparatus for forming 3D object, for feeding filaments in a filament spool of a 3D printer to a printing mechanism. The feeding apparatus at least comprises a frame structure, a transmission set, an actuator, a swing unit and a controller.

The frame structure has a passageway, and the passageway communicates the printing mechanism and the filament spool.

The transmission set is fastened on the passageway of the frame structure.

The actuator is fastened on the frame structure and used to drive the transmission set.

The swing unit is configured at one port of the passageway, wherein the port is near the filament spool.

The controller is fixed on the frame structure. The controller has a sensor and is electrically connected to the actuator and the sensor. Particularly, when the filaments in the filament spool enters the passageway and pushes the swing unit, the sensor senses a displacement of the swing unit so as to generate a sensing signal. Thereby, the controller controls the actuator to drive the transmission set so as to feed the filaments to the printing mechanism according to the sensing signal.

In one embodiment of the present invention, the actuator has at least a motor and the motor has a drive shaft.

In one embodiment of the present invention, the feeding apparatus further comprises a bearing plate that is fastened with the frame structure. The bearing plate has a plurality of retaining holes. A via hole is adjacent to the retaining holes. The via hole is also adjacent to a set of grouping holes. Particularly, a screw is through two of retaining holes so as to fasten the motor on the bearing plate, and the drive shaft of the motor is through the via hole after fastening the motor.

In one embodiment of the present invention, the frame structure is fastened on the bearing plate and has two symmetrical support parts. The support parts have a plurality of fastening holes, and the fastening holes are corresponded to the retaining holes at two edges of the bearing plate and fastened by the crew.

In one embodiment of the present invention, a beam section is configured between the two support parts. The passageway is configured on the beam section and has an open-type channel and an enclosed-type channel. The open-type channel has pivot portions on two sidewalls, and the pivot portions are to pivotally connect the swing unit. One end of the swing unit has a pivot shaft, and the pivot shaft is pivotally connected to the pivot portions so as to swing down one end of the swing unit into the open-type channel.

In one embodiment of the present invention, the beam section has a fastening portion, and the fastening portion is to fasten the controller.

In one embodiment of the present invention, the transmission set is consisted of a retaining bracket, an driving roller and a driven roller. The retaining bracket is fastened on the bearing plate of the actuator. A grouping portion is configured on the retaining bracket. The grouping portion has a through hole corresponding to the grouping hole of the bearing plate. The crew is through the through hole and the grouping hole for grouping, so as to fasten the retaining bracket on the bearing plate.

In one embodiment of the present invention, the grouping portion has a protrusion, and the protrusion has a pivot axis. The pivot axis has a groove, and the groove is grouped with a fastening sheet with a C-shaped buckle. The driven roller is pivotally connected to the pivot axis.

In one embodiment of the present invention, the driving roller is grouped on the drive shaft of the motor of the actuator and is configured to be corresponded with the driven roller. Also, the driving roller has a circle of rubber layer.

In one embodiment of the present invention, the driving roller and the driven roller of the transmission set are configured between the open-type channel and the enclosed-type channel of the frame structure.

In one embodiment of the present invention, the driven roller is a V-shaped roller or a V-shaped belt roller.

In one embodiment of the present invention, the controller comprises a circuit board and the sensor that is electrically connected to the circuit board. The sensor has a base body, and the base body has a concave slot. A sensing element is configured on two sidewalls of the concave slot, and the through holes corresponding to the rack are configured on the circuit board so as to fasten the circuit on the frame structure.

In one embodiment of the present invention, when the circuit board is fastened on the frame structure, the concave slot of the sensor is above the open-type channel. The swing unit on the open-type channel is pushed to have a displacement into the concave slot of the sensor, and the sensor senses the displacement of the swing unit to generate the sensing signal.

In one embodiment of the present invention, the swing unit is made of an opaque material.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

Based on one of embodiments of the present invention, it is described with figures as below.

Figure 1:
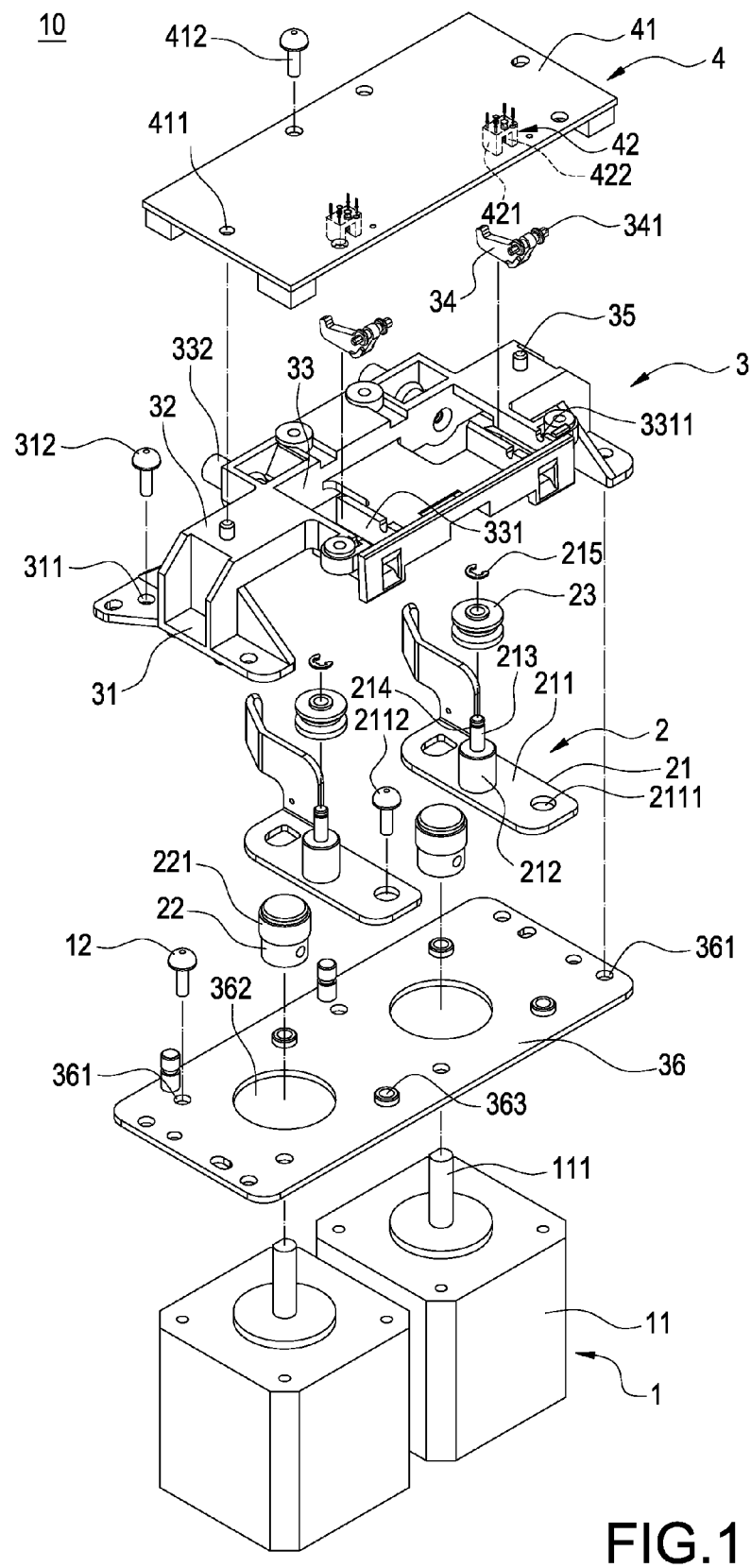
FIG. 1 is an exploded schematic view of the feeding apparatus according to one embodiment of the present invention.
Figure 2:
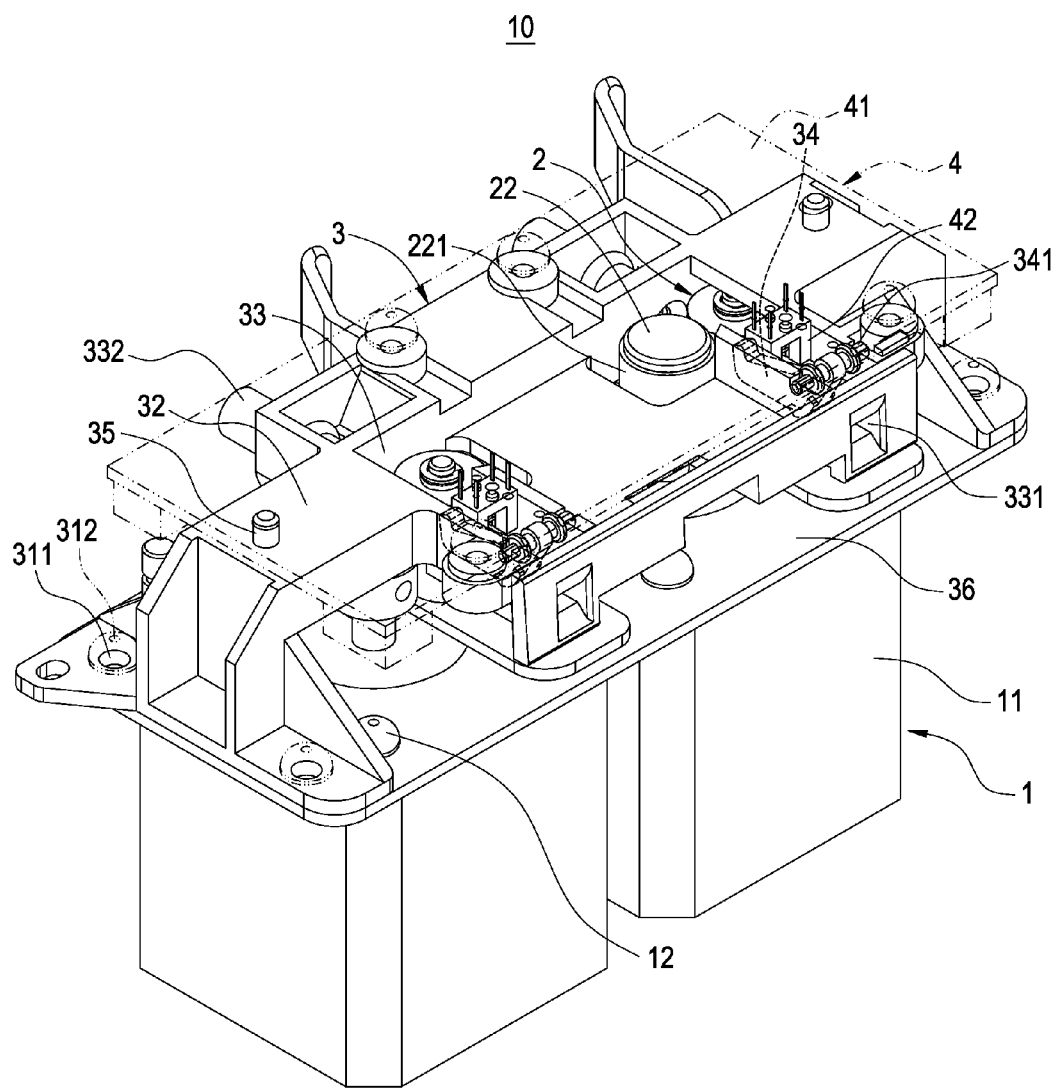
FIG. 2 is a schematic view of combination appearance of the feeding apparatus according to one embodiment of the present invention.
Figure 3:
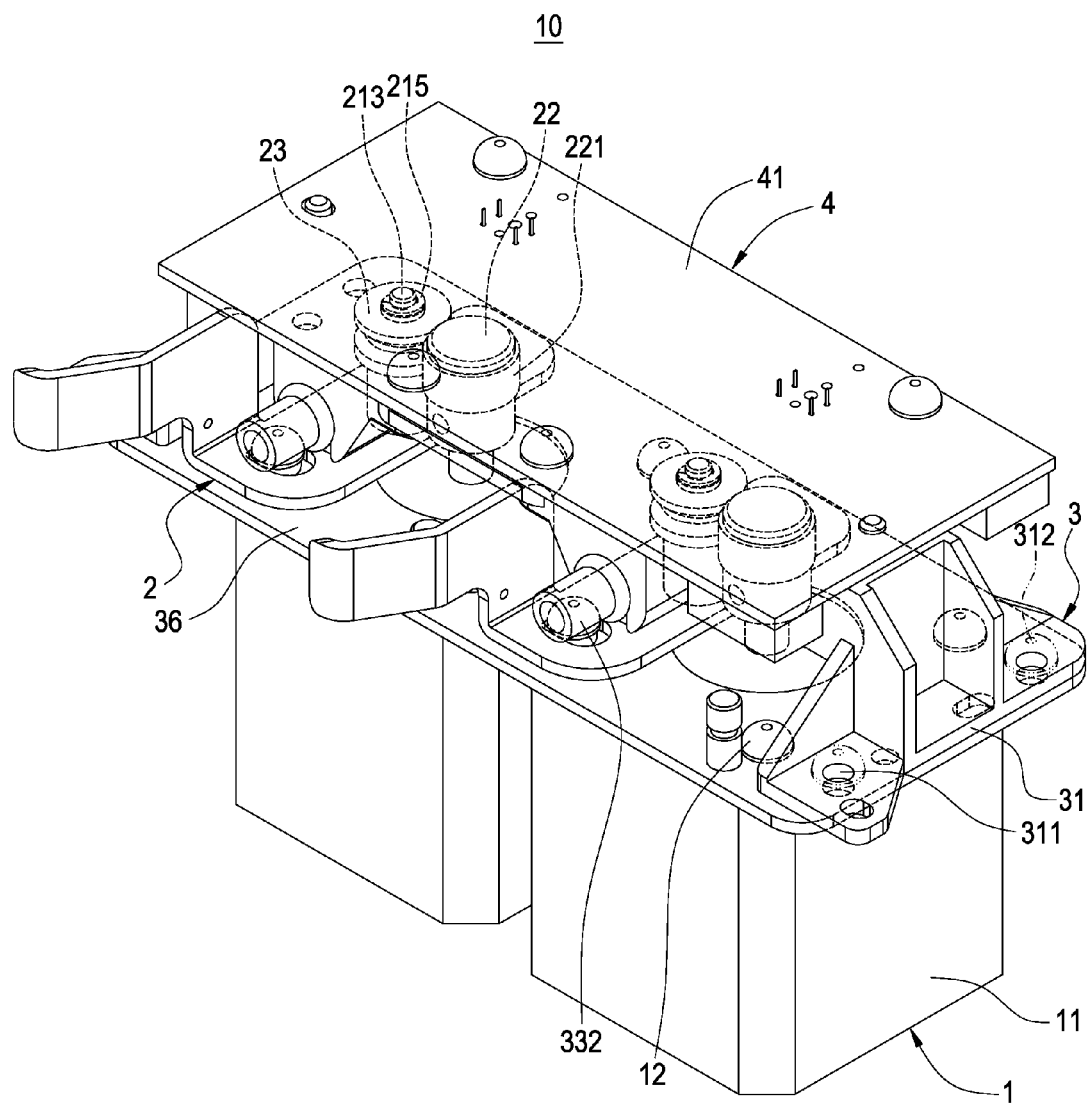
FIG. 3 is another schematic view of combination appearance, from a different view angle, of the feeding apparatus according to one embodiment of the present invention.
Figure 4:
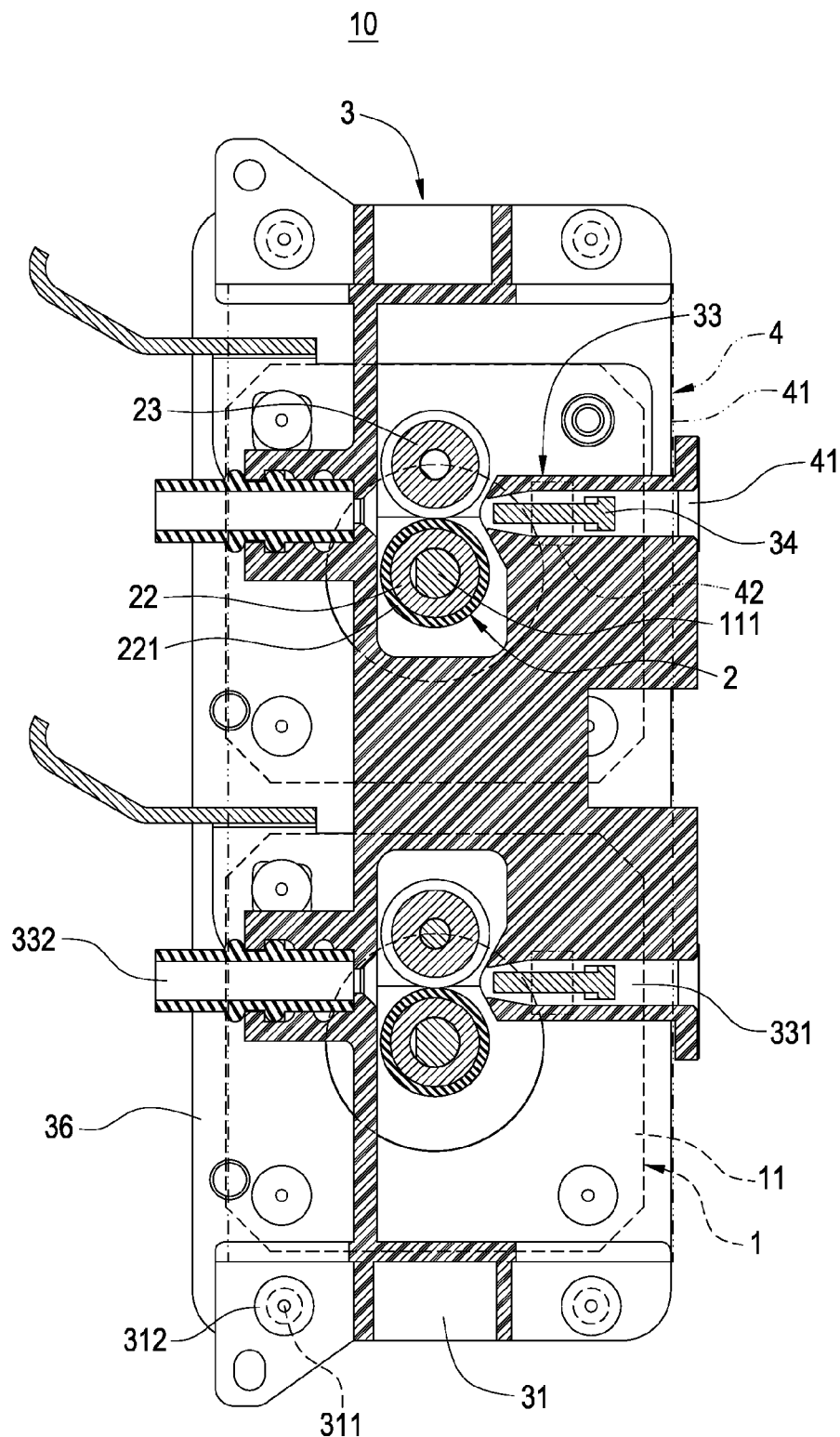
FIG. 4 is a top sectional view of the feeding apparatus according to one embodiment of the present invention.
Figure 5:
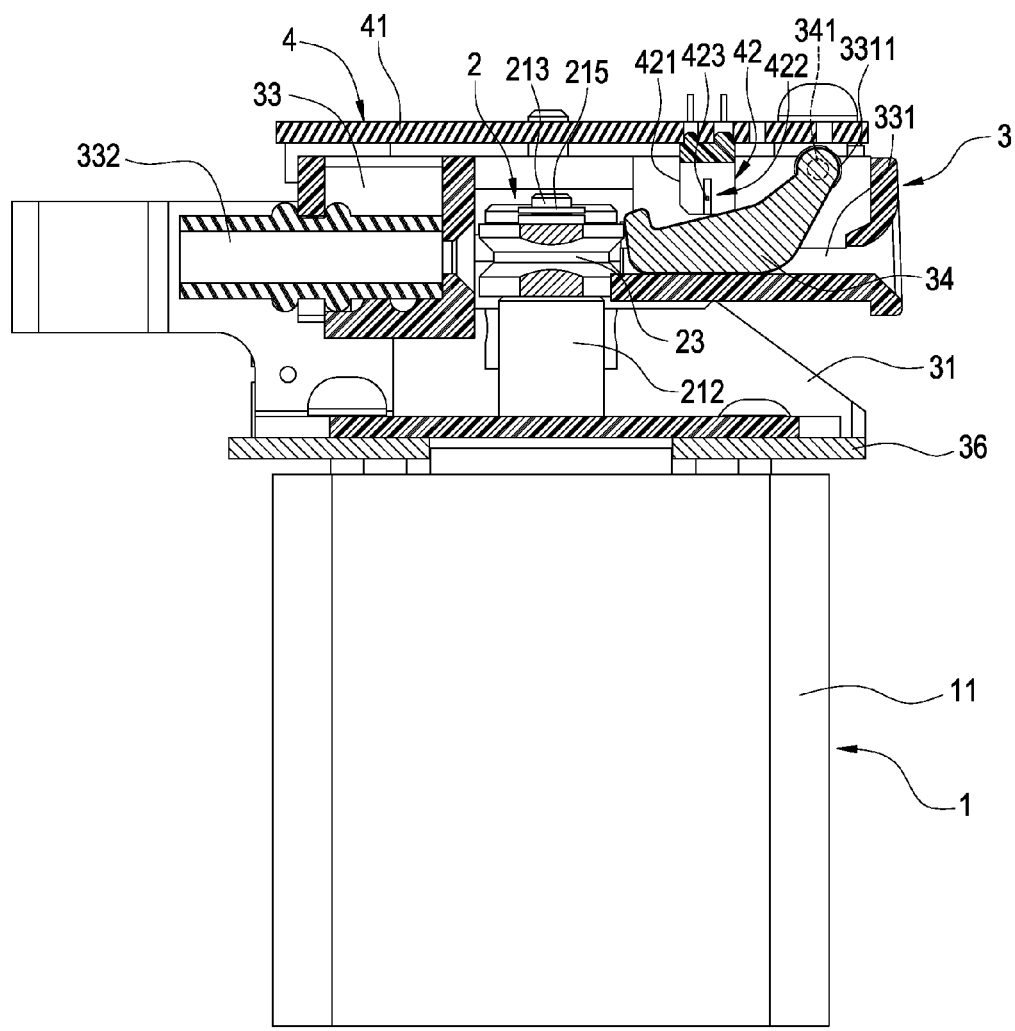
FIG. 5 is a side sectional view of the feeding apparatus according to one embodiment of the present invention.

Please refer to FIGS. 1~3, FIG. 1 is an exploded schematic view of the feeding apparatus according to one embodiment of the present invention, FIG. 2 is a schematic view of combination appearance of the feeding apparatus according to one embodiment of the present invention, and FIG. 3 is another schematic view of combination appearance, from a different view angle, of the feeding apparatus according to one embodiment of the present invention. Also see FIGS. 4~5, FIG. 4 is an upper sectional view of the feeding apparatus according to one embodiment of the present invention, and FIG. 5 is a side sectional view of the feeding apparatus according to one embodiment of the present invention. As shown in figures, the feeding apparatus for forming a 3D object 10 of the present invention at least comprises an actuator 1, a transmission set 2, a frame structure 3 and a controller 4.

The actuator 1 is fastened on a bearing plate 36 of the frame structure 3. The actuator 1 has at least one motor 11, and the motor 11 has a drive shaft 111.

The transmission 2 is fastened on a passageway 33 of the frame structure 3. The transmission set 2 is consisted of a retaining bracket 21, an driving roller 22 and a driven roller 23. The retaining bracket 21 is fastened on the bearing plate 36, and the retaining bracket 21 has a grouping portion 211. The grouping portion 211 has a through hole 2111 corresponded to the grouping hole 363. A screw 2112 is through the through hole 2111 and is assembled with the grouping hole 363 of the bearing plate 36, so as to fasten the retaining bracket 21 on the bearing plate 36. The grouping portion 211 has a protrusion 212, and the protrusion 212 has a pivot axis 213. The pivot axis 213 has a groove 214, and the groove 214 is assembled with a fastening sheet 215 with a C-shaped buckle. The driving roller 22 is assembled with the drive shaft 111 of the motor 11. The driving roller 22 has an annular rubber layer 221 on outer surface thereof, and the rubber layer 221 contacts with the transmitted article (not shown) so as to transmit the article via friction. The driven roller 23 is pivotally connected to the pivot axis 213 and configured to be corresponded to the driving roller 22. Then, the driven roller 23 is grouped on the groove 214 via the fastening sheet 215 so that the driven roller 23 would not loosen when rolling at the pivot axis 213. In the figure, the driven roller 23 may be a V-shaped roller or a V-shaped belt roller.

A bearing plate 36 is fastened on the frame structure 3, and the bearing plate 36 has a plurality of retaining holes 361. A via hole 362 is adjacent to the retaining holes 361, and a grouping hole 363 is adjacent to the via hole 362. A screw is through two of the retaining holes 361 so as to fasten the motor 11 on the bearing plate 36, and also to make the drive shaft 111 of the motor 1 through the via hole 362 so as to be assembled with the driving roller 22. Besides, the frame structure 3 has two symmetrical support parts 31, and the support parts 31 have a plurality of fastening holes 311, and the fastening holes 311 are corresponded to the retaining holes 361 on two sides of the bearing plate 36. Screws 312 are through the fastening holes and the retaining holes for fixing the bearing plate 36 on the supports 31. A beam section 32 is arranged between the two support parts 31, and at least one passageway 33 is arranged on the beam section 32. The passageway 33 has an open-type channel 331 and an enclosed passageway 332. The driving roller 22 and the driven roller 23 of the transmission set 2 are configured between the open-type channel 331 and the enclosed passageway 332 (as shown in FIG. 4). Moreover, a pivot portion 3311 is configured on two sidewalls of the open-type channel. The pivot portion 3311 is pivotally connected to a swing unit 34 so that the swing unit 34 is configured at a port that is near the filament spool (not shown). A pivot shaft 341 is configured at one end of the swing unit 34, and the pivot shaft 341 is pivotally connected to the pivot portion 3311 so that one end of the swing unit 34 swings down into the open-type channel 331 (as shown in FIG. 5). Also, a fastening portion 55 is configured on the beam section 32, and the fastening portion 35 is to fasten the controller 4. In the figure, the swing unit is made of an opaque material so as to prevent false actions because of the light transmittance into the filament in the filament spool, The controller 4 comprises a circuit board 41 and a sensor 42 that is electrically connected to the circuit board 41. The sensor 42 has a base body 421, and the base body 421 has a concave slot 422. Sensing elements 423 are arranged on two sidewalls of the concave slot 422. The circuit board 41 has a through hole 41 corresponded to the fastening portion 35, and a screw 412 is through the through hole 411 to fasten the circuit board 41 on the beam section 32 of the frame structure 3. When the circuit board 41 is fastened on the beam section 32, the concave slot 422 of the sensor 42 is arranged above the open-type channel 311. In the figure, the sensing element 423 is a shielded sensing element.

Figure 6:
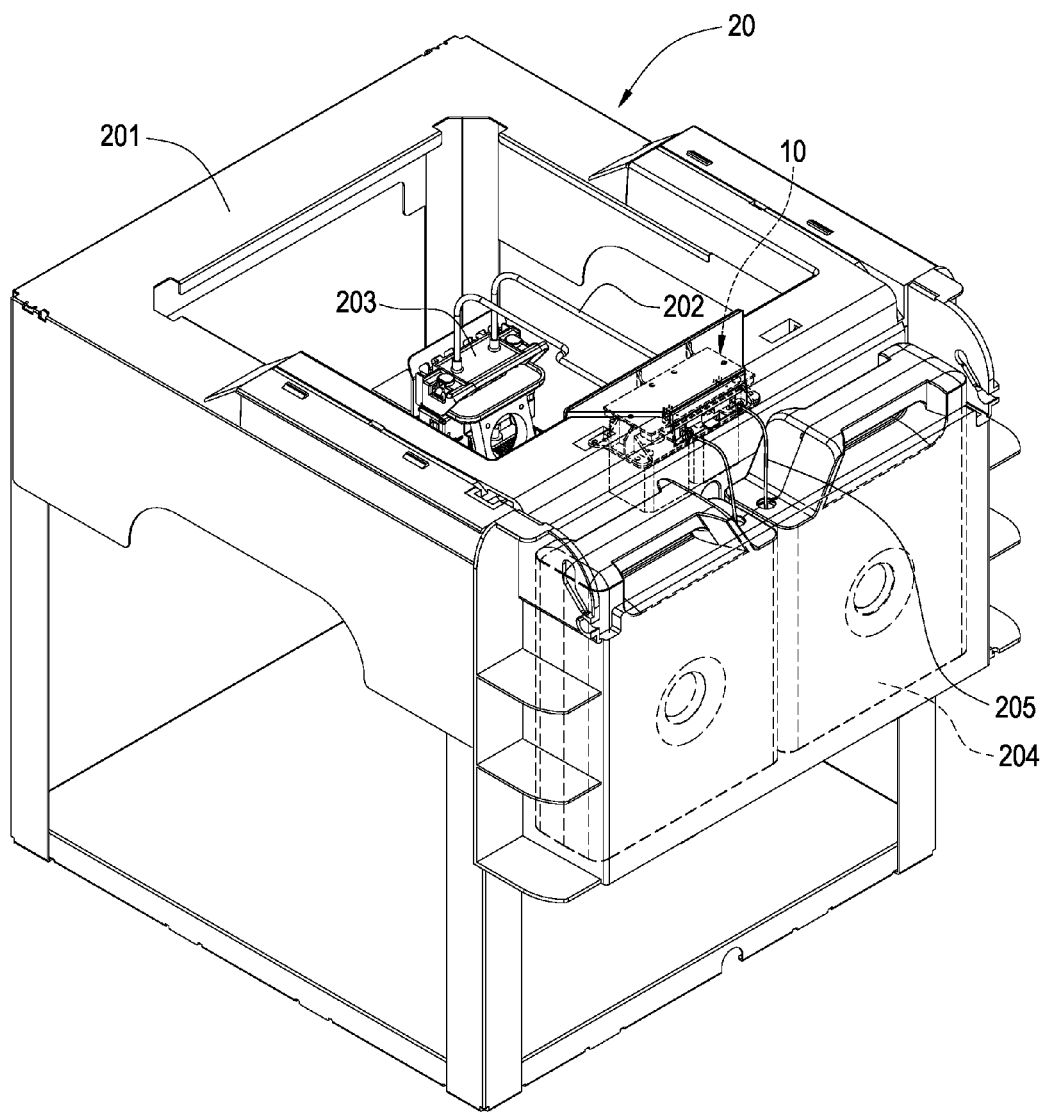
FIG. 6 is a schematic view of using status of the feeding apparatus according to one embodiment of the present invention.
Figure 7:
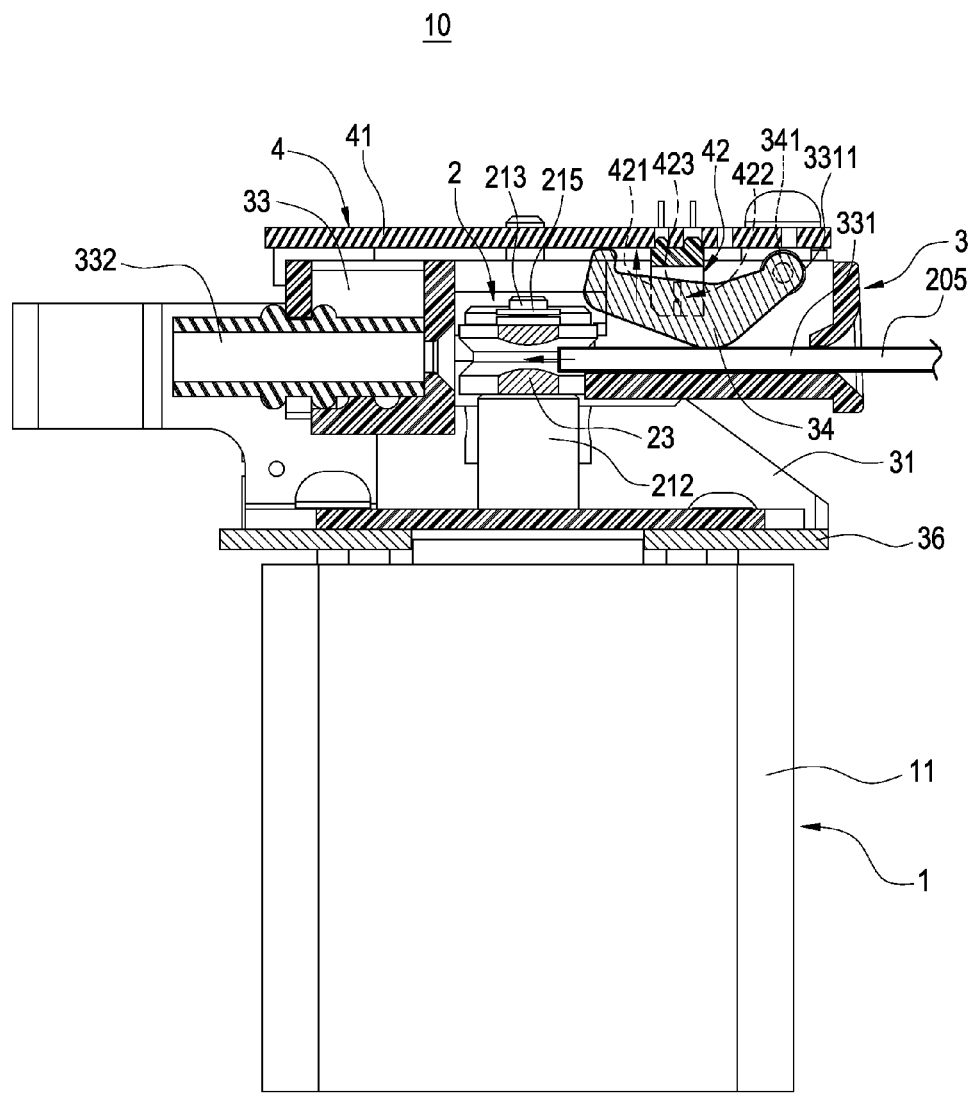
FIG. 7 is an upper schematic view of filament transmission of the feeding apparatus according to one embodiment of the present invention.
Figure 8:
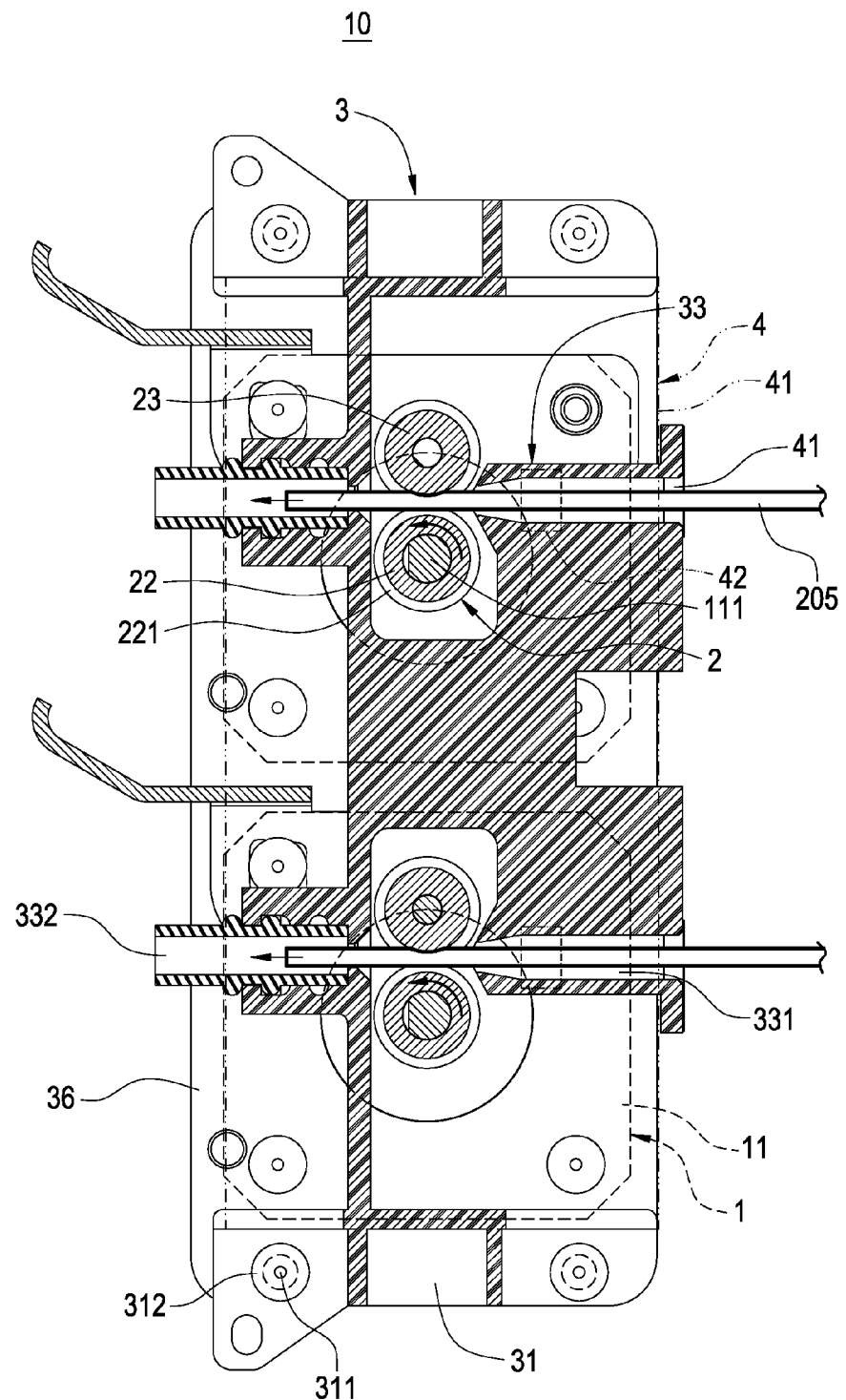
FIG. 8 is a side schematic view of filament transmission of the feeding apparatus according to one embodiment of the present invention.

Please refers to FIGS. 6~8, FIG. 6 is a schematic view of using status of the feeding apparatus according to one embodiment of the present invention, FIG. 7 is an upper schematic view of filament transmission of the feeding apparatus according to one embodiment of the present invention, and FIG. 8 is a side schematic view of filament transmission of the feeding apparatus according to one embodiment of the present invention. As shown in figures, the feeding apparatus 10 is configured inside the frame 201 of the 3D printer 20, and one end of the enclosed passageway 332 of the feeding apparatus 10 is connected to a tube 202 so as to be further connected to the printing mechanism 203.

When the 3D printer 20 is operating, the filament spool 204 is configured on the external side of the frame 201 of the 3D printer 29. After the filament 205 in the filament spool 204 is fed into a side port of the open-type channel 331, the filament 205 fed into the open-type channel 331 pushes the swing unit 34. Thus, the swing unit 34 has a displacement to move in the concave slot 422 of the base body 421 of the sensor 42 so that the swing unit 34 would block the light of the sensing element 423. As a result, the sensing element 423 of the controller 4 outputs a sensing signal, and the sensing signal drives the actuator 1, so that the motor 11 of the actuator 1 drives the driving roller 22 of the transmission set 2 to rotate and thus to further transmit the filament 205. At this moment, the driven roller 33 also rotates with the transmission of the filament 205. Therefore, the filament 205 can be fed into the enclosed-type channel 432, and then be fed to the printing mechanism 203 through the enclosed-type channel 432 and via the tube 202.

From the above, the feeding apparatus 10 is configured between the printing mechanism 203 and the filament spool 204, so that the filament 205 can be smoothly transmitted to the printing mechanism 203 without influencing the printing of the printing mechanism 203.

Moreover, in addition to the actuator 1, other elements such as the transmission set 2, the frame structure 3 and the controller 4 can also be arranged on the printing mechanism 203. When the sensing element 423 of the controller 4 senses the filament, the controller 4 would output a control signal to drive the actuator (not shown) of the printing mechanism 203. After that, the actuator of the printing mechanism 203 would drive the transmission 2 to feed the filament 205 to the printing mechanism 203 so as to print for a 3D object.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A feeding apparatus for forming 3D object, the feeding apparatus feeding filaments in a filament spool of a 3D printer to a printing mechanism and comprising:
    a frame structure, having a passageway for communicating the printing mechanism and the filament spool;
    a transmission set, fastened on the passageway of the frame structure;
    an actuator, fastened on the frame structure, used to drive the transmission set;
    a swing unit, configured at one port of the passageway, wherein the port is near the filament spool; and
    a controller, fixed on the frame structure, the controller having a sensor and the controller electrically connected to the actuator and the sensor;
    wherein when the filaments in the filament spool enters the passageway and pushes the swing unit, the sensor senses a displacement of the swing unit so as to generate a sensing signal, such that the controller controls the actuator to drive the transmission set so as to feed the filaments to the printing mechanism according to the sensing signal.

2. The feeding apparatus of claim 1, wherein the actuator has at least a motor and the motor has a drive shaft.

3. The feeding apparatus of claim 2, further comprising a bearing plate, fastened with the frame structure, the bearing plate having a plurality of retaining holes, a via hole adjacent to the retaining holes, the via hole also adjacent to a set of grouping holes, wherein a screw is through two of retaining holes so as to fasten the motor on the bearing plate, and the drive shaft of the motor is through the via hole after fastening the motor.

4. The feeding apparatus of claim 3, wherein the frame structure is fastened on the bearing plate, the frame structure has two symmetrical support parts, the support parts have a plurality of fastening holes, and the fastening holes are corresponded to the retaining holes at two edges of the bearing plate and fastened by the crew.

5. The feeding apparatus of claim 4, wherein a beam section is configured between the two support parts, the passageway is configured on the beam section, the passageway has an open-type channel and an enclosed-type channel, the open-type channel has pivot portions on two sidewalls, the pivot portions are to pivotally connect the swing unit, one end of the swing unit has a pivot shaft, and the pivot shaft is pivotally connected to the pivot portions so as to swing down one end of the swing unit into the open-type channel.

6. The feeding apparatus of claim 5, wherein the beam section has a fastening portion, and the fastening portion is to fasten the controller.

7. The feeding apparatus of claim 4, wherein the transmission set is consisted of a retaining bracket, an driving roller and a driven roller, the retaining bracket is fastened on the bearing plate of the actuator, a grouping portion is configured on the retaining bracket, the grouping portion has a through hole corresponding to the grouping hole of the bearing plate, and the crew is through the through hole and the grouping hole for grouping, so as to fasten the retaining bracket on the bearing plate.

8. The feeding apparatus of claim 7, wherein the grouping portion has a protrusion, the protrusion has a pivot axis, the pivot axis has a groove, the groove is grouped with a fastening sheet with a C-shaped buckle, and the driven roller is pivotally connected to the pivot axis.

9. The feeding apparatus of claim 8, wherein the driving roller is grouped on the drive shaft of the motor of the actuator and is configured to be corresponded with the driven roller, and the driving roller has an annular rubber layer on outer surface thereof.

10. The feeding apparatus of claim 9, wherein the driving roller and the driven roller of the transmission set are configured between the open-type channel and the enclosed-type channel of the frame structure.

11. The feeding apparatus of claim 10, wherein the driven roller is a V-shaped roller or a V-shaped belt roller.

12. The feeding apparatus of claim 1, wherein the controller comprises a circuit board and the sensor electrically connected to the circuit board, the sensor has a base body, the base body has a concave slot, a sensing element is configured on two sidewalls of the concave slot, and the through holes corresponding to the frame structure are configured on the circuit board so as to fasten the circuit on the frame structure.

13. The feeding apparatus of claim 12, wherein when the circuit board is fastened on the frame structure, the concave slot of the sensor is above the open-type channel, the swing unit on the open-type channel is pushed to have a displacement into the concave slot of the sensor, and the sensor senses the displacement of the swing unit to generate the sensing signal.

14. The feeding apparatus of claim 1, wherein the swing unit is made of an opaque material.

* * * * *